Aug. 21, 1923.  
D. TURNER  
FABRIC MEASURING MACHINE  
Filed Dec. 11, 1919

Inventor  
Douglas Turner  
By: Sheridan, Jones, Sheridan & Smith  
Attys.

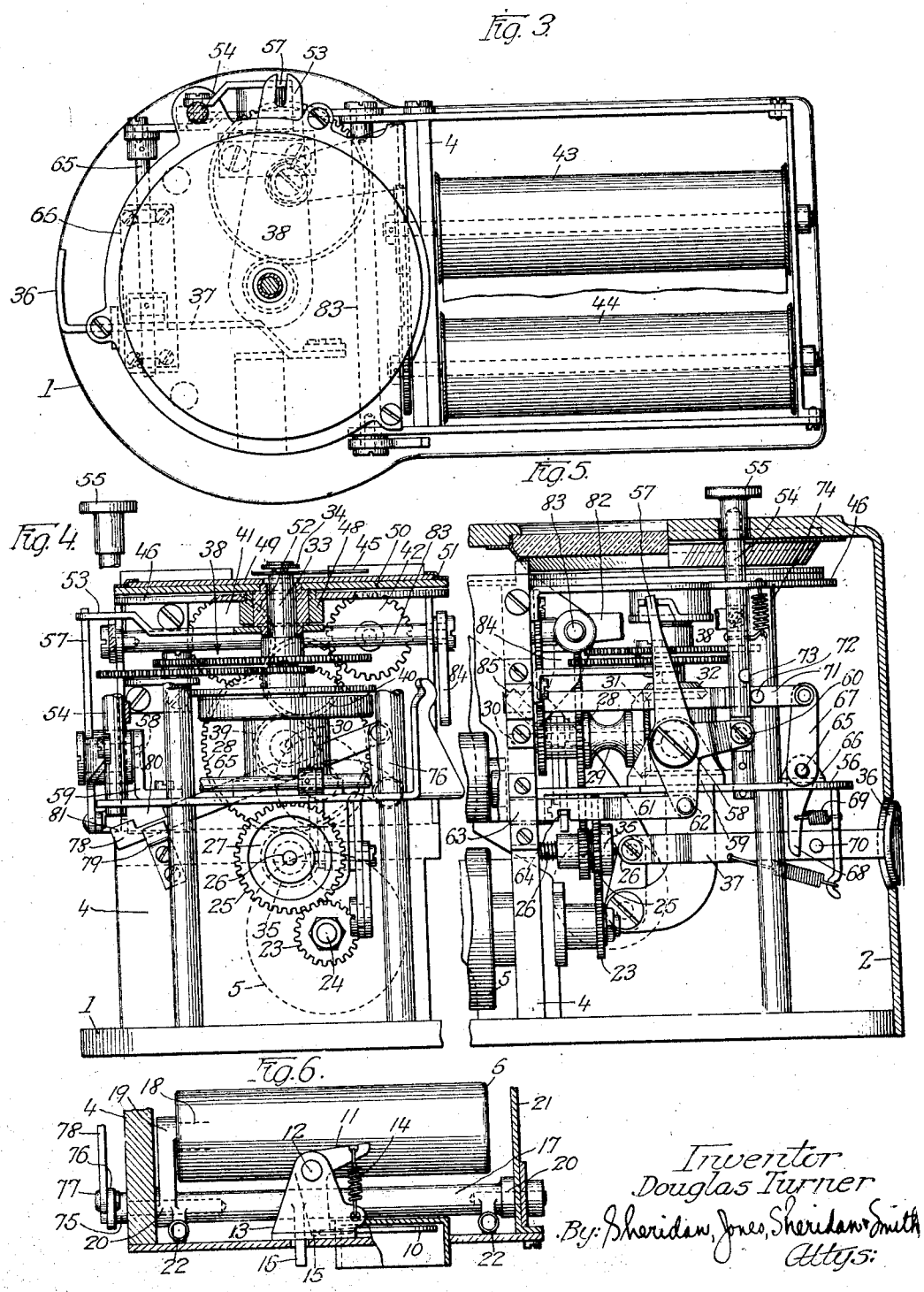

Patented Aug. 21, 1923.

1,465,322

UNITED STATES PATENT OFFICE.

DOUGLAS TURNER, OF ST. LOUIS, MISSOURI, ASSIGNOR TO THE MEASUREGRAPH COMPANY, OF ST. LOUIS, MISSOURI, A CORPORATION OF DELAWARE.

FABRIC-MEASURING MACHINE.

Application filed December 11, 1919. Serial No. 344,006.

*To all whom it may concern:*

Be it known that I, DOUGLAS TURNER, a citizen of the United States, residing at St. Louis, State of Missouri, have invented certain new and useful Improvements in Fabric-Measuring Machines, of which the following is a specification.

My invention relates to improvements in fabric measuring machines, and more particularly to a machine of this character having compensating means to permit the accurate measuring of remnants. In such machines the fabric is drawn between a pair of rollers, the rotation of which furnishes an indication of the length of the fabric passing a given point. This point is usually in the plane of the cutting knife, and necessarily to one side of the line of contact with the two rollers. Since the measurement begins and ends at or near the knife the last portion of the remnant, that is the portion extending from the knife to the end of the remnant, which is just leaving the rollers, is not measured, as the rollers stop turning as soon as the fabric is drawn through them. Therefore it is necessary to add to the reading an amount equal to the distance from the rollers to the knife, in order to obtain an accurate indication of the length of the remnant.

In a prior application Ser. No. 312,239, Patent No. 1,392,723, Oct. 4, 1921, this result is attained by depressing a button which advances the length indicator the desired amount. In the embodiment of the invention shown herein the scale over which the indicating hand sweeps is moved to increase the reading, this adjustment taking place without disturbing the connections between the measuring roll and the indicating hands.

The objects of the invention are to provide means for making this adjustment; to provide mechanism which will minimize the danger of error arising out of an improper operation of the machine; and to provide a generally improved construction.

In the drawings—

Fig. 3 is a top view of the machine with the case and dial removed;

Fig. 4 is a rear elevation thereof;

Fig. 5 is a side elevation of the rear part of the machine, viewed from the right side, the case being shown in section; and Fig. 6 is a plan view of the presser roll and the means for moving it towards the measuring roll.

Figure 1:
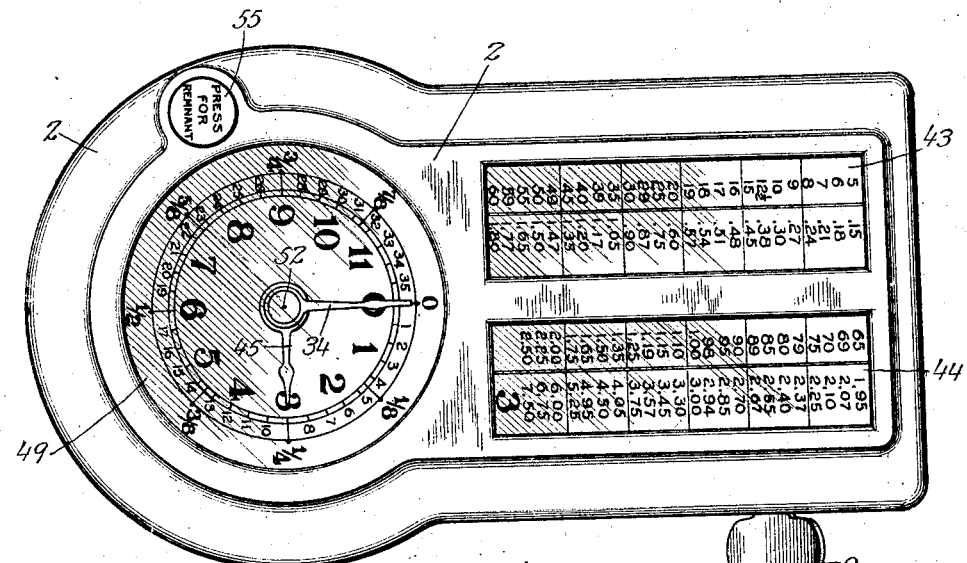
Figure 1 is a top plan view of the machine.

The mechanism, in the form which the invention assumes in practice, is mounted on a base 1, and is inclosed by a case 2 having a rectangular front portion and a cylindrical rear portion. Said case has a horizontal opening 3 therein in the front part, which permits the insertion of the goods when a measurement is to be made. A vertical plate 4 is mounted on the base plate and supports most of the mechanism in the case. The measuring roll 5 is supported by said plate, and is preferably one-eighth of a yard in circumference. It is positioned with its upper surface in the plane of the opening in the casing to permit contact with the goods to be measured. A presser roller 6 is arranged above the measuring roll and parallel thereto. To begin a measurement this roll is lowered against the goods, which is frictionally held between the two rollers. As the operator pulls the goods between the rolls the rotation of the lower roll is communicated to length-indicating and price-indicating devices. At the end of the measurement, in case the piece of goods is longer than what is required, the edge of the goods is cut by means of an upper knife blade 7 and a lower shear plate 8, said knife blade being operated by notching button 9.

Figure 2:
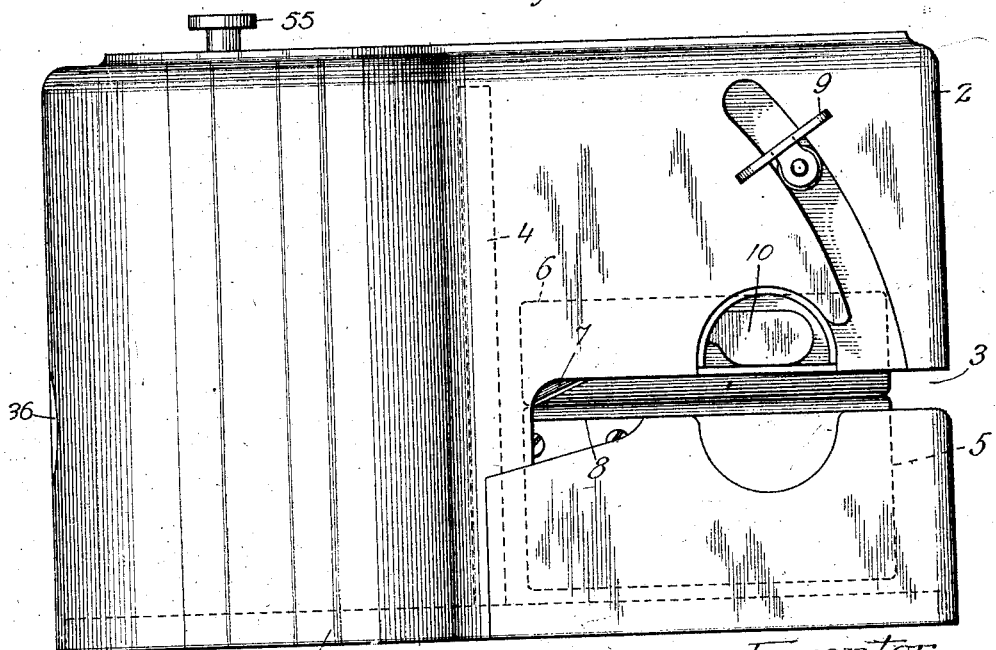
Fig. 2 is a side elevation thereof.

In order to bring the rolls together in beginning a measurement, the operator presses inwardly a starting button 10 (Figs. 2 and 6), said button forming part of a bell crank lever 11, pivoted at 12 to the bracket 13. The bell crank lever is held in normal position by a spring 14 which tends to hold the shoulder 15 against the projection 16 of the rocker shaft 17. The presser roller 6 is rotatably mounted on a shaft 18 attached to an arm 19 on the rocker shaft, said shaft being rotatably mounted on pins 20 mounted in a frame plate 21 and in the plate 4. Springs 22 Fig. 6 tend to move said presser roll downwardly against the measuring roll, said presser roll, however, being locked in upper position by said parts 15 and 16. The construction and mode of operation of this presser roller rocker shaft are fully illustrated in my Patent No. 1,421,863, granted July 4, 1922. When the operator presses the starting button 10, however, said presser roll is released. When the operator presses the notching button 9 at the end of the measuring operation an integral extension thereon—not shown—engages the arm 16, pressing the same against the action of springs 22 and raising the upper roll 6. During this movement the shoulder 15 snaps over the arm 16, thereby locking the upper roll in elevated position.

Motion is transmitted from the measuring roll 5 through a train of gears, which comprises gear 23, mounted upon the measuring roll shaft 24, meshing with the gear 25, which is rotatably mounted on a bushing on the shaft 26. A pinion 27 meshes with a gear 28, attached to bushing 29, which is rotatably mounted on the shaft 30—see Figs. 4 and 5. A bevel gear 31 is also mounted on said shaft and meshes with a bevel gear 32 mounted on a vertical sleeve 33, to which the longer hand 34 is secured. This hand sweeps over the dial and indicates fractions of a yard. The train of gears also includes a clutch mechanism, indicated generally by reference 35 (see Fig. 5). At the end of the measuring operation, when it is desired to reset the mechanism to zero position, the resetting button 36 is depressed. This button projects slightly from the rear of the machine and, when actuated, moves the bar 37 inwardly, moving the shaft 26 longitudinally and releasing the clutch members, thereby disconnecting the measuring roll from the gear train. Said gear train also includes a reduction gearing, shown generally by reference 38 Fig. 4, which gives a 12 to 1 reduction between the inch hand or fraction hand 34 and the yard hand 45. Motion is also transmitted by the gear 39 on shaft 30 through the idler 40 to the gears 41 and 42 which turn the chart cylinders 43 and 44. This mechanism also includes a return chart cylinder roll having a spring therein, the tension of which is increased when the measurement is being made, and which unwinds when released to restore the charts to initial position. This chart mechanism is illustrated in part herein, but forms no part of the present invention per se, and is more fully illustrated in other earlier applications. These charts, as will be understood, carry computations representing the prices of goods and are advanced past sight openings in the rectangular portion of the casing in synchronism with the hands—see Fig. 1.

The remnant button mechanism includes a shelf plate 46 horizontally disposed at the top of the plate 4 under the hands. This shelf carries a bearing 48. The dial 49 is attached to a second plate 50 by means of a ring 51, the plate 50 having attached thereto and being supported on a hollow bushing 52 rotatably mounted in the bearing 48. A horizontally arranged arm 53 is also attached to the bushing 52. With this arrangement the dial 49 can be rotated about its axis by moving the arm 53. A vertical stem 54 carries the remnant button 55, and is slidably mounted in the plate 46 and the sub-base 56. The lever 57 has three arms, as shown in Fig. 5, and is mounted on a stud 58 attached to the bracket 59. One of said arms is attached to the vertical stem 54 by means of a screw 60. Another is attached to the locking bar 61 by means of rivet 62, said locking bar being slidably mounted in a bracket 63 attached to the vertical plate 4, and having a notch 64. This mechanism also includes an auxiliary horizontally disposed shaft 65 carried by bracket 66 attached to said sub-base. Said shaft carries at one end a vertical arm 67 and a depending arm 68 near the middle thereof. A spring 69 draws the depending arm 68 to the right, in position to be engaged by a stud 70 on the resetting bar 37. A second locking bar 71 carries a pin 72, which is held against the vertical shaft 54 by said spring.

When it is desired to measure a remnant on the machine the starting button 10 is pushed inwardly, lowering the upper roller against the goods, which is also in contact with the measuring roll. The remnant button 55 is then depressed, lowering the stem 54 sufficiently to bring the notch 73 opposite the pin 72. This allows the bar 71 to be moved to the left by the spring 69, causing the pin 72 to enter the notch 73, and thereby hold the remnant button in depressed position, with the arm 68 in contact with the pin 70. Depressing the remnant button swings the arm 57 to the right through a small angle sufficient to swing the arm 53 and rotate the dial under the hands 34 and 45, thereby increasing the reading. The amount of the increase for the longer hand, which measures inches, is proportional to the distance from the contact line of the rollers to the edge of the shears. This increases the reading to compensate for what would otherwise be an error. While the reading of the short, or yard, hand is also modified somewhat, the operator takes no account of this changed reading, which amounts only to a small fraction of a yard. The dial remains in this adjusted position until the resetting button 36 is pressed inwardly, moving the bar 37 and pin 70 to the left and, through the levers 67 and 68 withdrawing the pin 72 from the notch 73 and permitting the spring 74 to restore the remnant button to its original position.

In order to prevent an inexperienced or dishonest operator from getting an incorrect measurement by pressing the remnant button and increasing the dial reading, when the piece measured is not a remnant, the following mechanism is provided: The rocker shaft 17 (Fig. 6) carries a vertical arm 76. A pin 77 secures the upper end of said arm to a diagonally arranged locking bar 78, Fig. 4, said bar sliding in a guide 79 mounted on the vertical plate 4. This bar has a notch 80 arranged to cooperate with the notch 64 of bar 61. When the presser roll is depressed the notch 80 is pushed opposite the bar 61, thereby permitting movement of the latter. When said presser roll is raised the notch is removed from the path of the bar 61, and said bar fills the notch 64 on said bar, thus preventing the depression of the remnant button, and the consequent increase in the reading.

It is also advantageous to lock the knife or shear against operation when remnants are being measured, as said knife is not required under these conditions. This is accomplished by an arm 82 mounted on a horizontal shaft 83—see Figs. 4 and 5,—and having its end received within a notch in the remnant button stem. Said horizontal shaft carries at its right hand end a locking pawl 84, which is mounted to cooperate with a notch 85 in the back of the shear blade housing. Said shear is held normally in uppermost position by means of a spring (not shown), but when the remnant button is depressed said locking pawl is arranged to enter the notch 85, thereby preventing operation of the shear blade. If the operator should depress the remnant button when measuring goods off the bolt, and thereafter attempt to cut the goods, the shears would be locked, and it would be necessary to release the remnant button, i. e. to reset the machine and remeasure the goods before she can notch them. It will be noted that the remnant button is locked when the presser roll is raised. This compels the operator to lower the presser roll before the remnant button can be operated.

From the foregoing description it will be seen that the remnant button can be depressed either during or after the measuring operation, but not before, because prior thereto the upper roll is in raised position and the remnant button is locked against operation by the notch 80 in the bar 78. If the remnant button is depressed during or after the measuring of a remnant, the dial is adjusted to provide for an additional reading of one inch. However, if the operator attempts to use the shear before resetting the machine to zero, said operation will be prevented by means of the pawl 84. In order to raise the upper roll to have the machine ready for the next measuring operation, the resetting button 36 must necessarily be pressed, thereby releasing the remnant button device, and the shear as well, and permitting it to be used for raising the upper roll in the usual manner.

The machine may also be provided with a sight opening, through which the word "Remnant", or other indication, may be brought into the view of the operator when the remnant button is depressed. Such a device is disclosed in the earlier application referred to herein.

In using the machine one end of the remnant is held between the rolls, the operator grasping one edge of the remnant with the thumb against the setting button 10, which is thereupon pressed inwardly, lowering the upper roller to clamp the goods between both rollers, the remnant button being then depressed and the goods drawn completely through the machine. The operator then takes the reading and presses the re-setting button.

If the operator is not measuring a remnant, the goods are inserted in the same way as that described above, but the remnant button would not be depressed. The machine would then give a correct measurement for measuring from a roll.

After the reading has been taken from the indicating mechanism, then the pressing of the resetting button will open the clutch mechanism 35 and the indicating mechanism will then be automatically reset to zero.

If the remnant button has been pressed and the piece being measured is not a remnant, then the rock shaft 83 will operate through the arm 84 to lock the knife so that the knife cannot be operated. The failure of the knife to operate would indicate to the operator that he should not have pushed the remnant button, and he will correct his reading of the instrument accordingly.

The invention is not to be limited to the particular embodiment disclosed herein, as said invention may be embodied in various other forms falling within the scope of the appended claims.

I claim :—

1. In a fabric measuring machine, a measuring roll, a relatively movable hand and scale for indicating lengths, means connecting one of said parts with said measuring roll, and means for moving said scale to modify said length reading a predetermined amount.

2. In a fabric measuring machine, a measuring roll, a rotatable hand, a circular scale adjacent thereto with length indications thereon, means connecting said hand with said measuring roll, and means for rotating said scale to correct the reading thereof.

3. In a fabric measuring machine, a measuring roll, means adjacent thereto for marking the goods being measured, a hand and dial, mechanical connections between said hand and said roll, and manually operable means for moving said dial an amount proportional of the distance from said roll to said marking means.

4. In a fabric measuring machine, a pair of rolls between which the goods to be measured is passed, a hand and dial for indicating lengths, mechanical connections between said hand and one of said rolls, means for separating said rolls, a remnant button connected with said dial to move the latter, and means locking said remnant button in inoperative position when said rolls are separated.

5. In a fabric measuring machine, a pair of rolls, a shear, means for separating said rolls, a hand connected to one of said rolls, a dial associated with said hand, a manually operable device for moving said dial, and means cooperating with said manually operable device and said shear, whereby the latter may be locked by the former to prevent operation thereof.

In testimony whereof, I have subscribed my name.

DOUGLAS TURNER.